United States Patent
Taniguchi

(10) Patent No.: US 7,519,403 B2
(45) Date of Patent: Apr. 14, 2009

(54) MOBILE TERMINAL AND CONTROL METHOD OF RECORDING AND PLAYING BACK OF BROADCAST PROGRAM IN A MOBILE TERMINAL

(75) Inventor: Keiichi Taniguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 533 days.

(21) Appl. No.: 11/257,130

(22) Filed: Oct. 25, 2005

(65) Prior Publication Data
US 2006/0089098 A1    Apr. 27, 2006

(30) Foreign Application Priority Data
Oct. 27, 2004    (JP) ............. 2004-313172

(51) Int. Cl.
H04M 3/00    (2006.01)
H04M 1/00    (2006.01)

(52) U.S. Cl. ............ 455/575.3; 455/550.1; 455/418

(58) Field of Classification Search ............ 455/418, 455/575.3, 414.1, 566, 550.1, 556.2
See application file for complete search history.

(56) References Cited

U.S. PATENT DOCUMENTS

| 6,018,504 | A | * | 1/2000 | Sakamoto et al. ............ 369/7 |
| 6,396,924 | B1 | | 5/2002 | Suso et al. |
| 6,456,841 | B1 | * | 9/2002 | Tomimori ............ 455/412.2 |
| 7,058,376 | B2 | * | 6/2006 | Logan et al. ............ 455/186.1 |
| 2003/0078000 | A1 | * | 4/2003 | Tatsumi et al. ............ 455/3.06 |
| 2003/0144036 | A1 | * | 7/2003 | Ito ............ 455/566 |
| 2004/0132511 | A1 | * | 7/2004 | Yamamoto ............ 455/575.3 |
| 2004/0204122 | A1 | * | 10/2004 | Opela et al. ............ 455/565 |
| 2005/0020325 | A1 | * | 1/2005 | Enger et al. ............ 455/575.3 |
| 2006/0035677 | A1 | * | 2/2006 | Aerrabotu et al. ............ 455/565 |

FOREIGN PATENT DOCUMENTS

| EP | 1 337 103 | 8/2003 |
| EP | 1 424 838 | 6/2004 |
| WO | WO 02/51100 | 6/2002 |

* cited by examiner

*Primary Examiner*—Nay A Maung
*Assistant Examiner*—Andrew Wendell
(74) *Attorney, Agent, or Firm*—Sughrue Mion, PLLC

(57) ABSTRACT

Disclosed is a mobile terminal capable of receiving a broadcast signal, in which two housings are joined. The mobile terminal includes a relative position detecting unit for detecting a change in relative position of the two housings, and a control unit to control recording and playing back of a broadcast program based on detection result. When a change in the relative positions of the two housings is detected during viewing or listening to a broadcast program under reception in a use state, viewing or listening is interrupted and recording in a memory is started, and when the use state is detected again, viewing or listening is resumed from a interrupted timing while continuing record.

12 Claims, 4 Drawing Sheets

MOBILE TERMINAL AND CONTROL METHOD OF RECORDING AND PLAYING BACK OF BROADCAST PROGRAM IN A MOBILE TERMINAL

BACKGROUND OF THE INVENTION

1. Field of the Invention

The present invention relates to a mobile terminal capable of receiving broadcast signals, a control method of recording and playing back of a broadcast program in a mobile terminal, and its program.

2. Description of the Related Art

A mobile terminal capable of receiving broadcast signals has already been known. And, even if a user of the mobile terminal interrupts viewing or listening to a broadcast program currently being received with a certain event, also a technology which can view or listen to the broadcast program from an interrupted timing has already been known.

For example, there is a portable viewing or listening equipment capable of receiving a terrestrial digital broadcast signal (see, JP 2003-101921 A). While a user receives the terrestrial digital broadcast signal and is viewing or listening to a broadcast program, the equipment can simultaneously record the broadcast program currently being received in a memory card and continue only recording of the broadcast program with a predetermined operation by the user. That is, when the user has interrupted viewing or listening to the broadcast program, a mark (information) showing timing of interruption is recorded in the memory card with the predetermined operation of the user. And, when the user views or listens to the broadcast program later, playback of the broadcast program starts from the interrupted timing. Accordingly, even if the user has interrupted viewing or listening to the broadcast program currently being received with a certain event, it is possible to viewing or listening to it in continuity by playing back the recorded broadcast program afterward.

In the same way, there is a portable viewing or listening equipment capable of receiving a terrestrial digital broadcast signal (see, JP 2003-111004 A). On the way of receiving, a broadcast signal and viewing or listening to a broadcast program, when a user picks up a built-in phone and begins a telephone call, the equipment starts recording a broadcast program currently being received in a built-in memory. As the telephone call ends, the equipment reads the recorded broadcast program from the built-in memory simultaneously while continuing record. Thus, it is possible to play back the broadcast program from the interrupted timing with end of a telephone call.

In addition, there is a cellular phone capable of receiving TV broadcast signal. (see, JP 2004-193944 A). On the way of receiving a broadcast signal and viewing or listening to a broadcast program, when a user begins a telephone call, the cellular phone automatically starts recording of the broadcast program in a memory. And as the telephone call ends, the cellular phone automatically reads the recorded broadcast program from the memory simultaneously while continuing record.

Moreover, there is a flip or holder type mobile terminal capable of saving a display screen according to a data format under the present display (see, JP 2004-64294 A). When a folded state (flip close) of the mobile terminal is detected, the mobile terminal can save the display screen currently displayed in a memory in a saving method according to a data format in spite of display content. And when an unfolded state (flip open) of the mobile terminal is detected later, this mobile terminal can automatically read the saved display screen from the memory.

However, as to the portable viewing or listening equipment disclosed in JP 2003-101921 A, in order to interrupt viewing or listening to a broadcast program currently being received, it is necessary for the user to operate for adding the mark showing the timing of interruption in the memory card. In case the user has neglected the operation, it is not possible to view or listen to the broadcast program after the interrupted timing except for the portion which has already been viewed or listened.

In the same way, as to the portable viewing or listening equipment disclosed in JP 2003-111004 A, it is the case of a telephone call start that is possible to start playing back of the recorded broadcast program simultaneously with a telephone call end. In case the user has done other operation, it is not possible to view or listen to the broadcast program after the interrupted timing except for the portion which has already been viewed or listened to.

Moreover, as to the cellular phone disclosed in JP 2004-193944 A, it is the case of a telephone call start that is possible to start playing back of the recorded TV broadcast program simultaneously with a telephone call end. In case the user has done other operation, it is not possible to view or listen to the broadcast program after the interrupted timing except for the portion which has already been viewed or listened.

In addition, as to the flip or holder type mobile terminal disclosed in JP 2004-64294 A, it is the screen image currently displayed that is possible to save in a memory by operation of flip close of the mobile terminal. And, it is the saved contents of display that is possible to read out from the memory by operation of flip open of the mobile terminal. Thus, the mobile terminal is not possible to receive a broadcast signal, record a broadcast program, and play back the recorded broadcast program.

SUMMARY OF THE INVENTION

The present invention has been made to solve the above and other exemplary problems, and therefore an exemplary feature of the present invention is continuously to view and listen to the broadcast program currently being received by changing relative position of two housings.

Another feature of the present invention is to reduce storage capacity of a memory.

In order to attain the above-mentioned and other exemplary features, the present invention provides a mobile terminal. The mobile terminal includes a relative position detecting unit which detects a change in relative position of the two housings and a control unit which controls recording and playing back of a broadcast program based on detection result.

Moreover, in order to attain the above-mentioned and other exemplary features, the present invention provides a control method for recording and playing back of a mobile terminal. The control method includes steps of detecting a change in relative position of the two housings and controlling recording and playing back of a broadcast program based on detection result.

Furthermore in order to attain the above-mentioned and other exemplary features, the present invention provides a computer program for executing a control of recording and playing back in a mobile terminal. The computer program includes steps of standing by receipt of a broadcast signal in a use state, starting outputting the broadcast program based on a command by a user, detecting a change of relative position of the two housings, starting recording in a memory when a change in relative positions of the two housings is detected, starting playback of the recorded broadcast program when the use state is detected again, and stopping playing back when playback of the recorded broadcast program is terminated.

The exemplary mobile terminal constituted as described above starts record/playback of the broadcast program when a change of a relative position of two housings is detected during receiving a broadcast signal and viewing and listening to the broadcast program. Therefore, even if a user has folded the two housings during receiving and reproducing the broadcast signal, the user can view or listen to the broadcast program from the folded timing when the two housings is unfolded again. That is, the user can view and listen to the broadcast program without breaking off by operation of fold/unfold (flip open/close).

Preferably, the user can perform record/playback of the broadcast program suitable for use purpose of the user by setting up beforehand whether record/playback is started by detecting change in the relative position of two housings.

BRIEF DESCRIPTION OF THE DRAWINGS

The above and other exemplary features, and advantages of the present invention will become more apparent from the following detailed description when taken in conjunction with the accompanying drawings wherein.

DETAILED DESCRIPTION OF THE EXEMPLARY EMBODIMENTS

Hereinafter, a description will be given in more detail of an exemplary mobile terminal according to the present invention with reference to the accompanying drawings.

Figure 1:
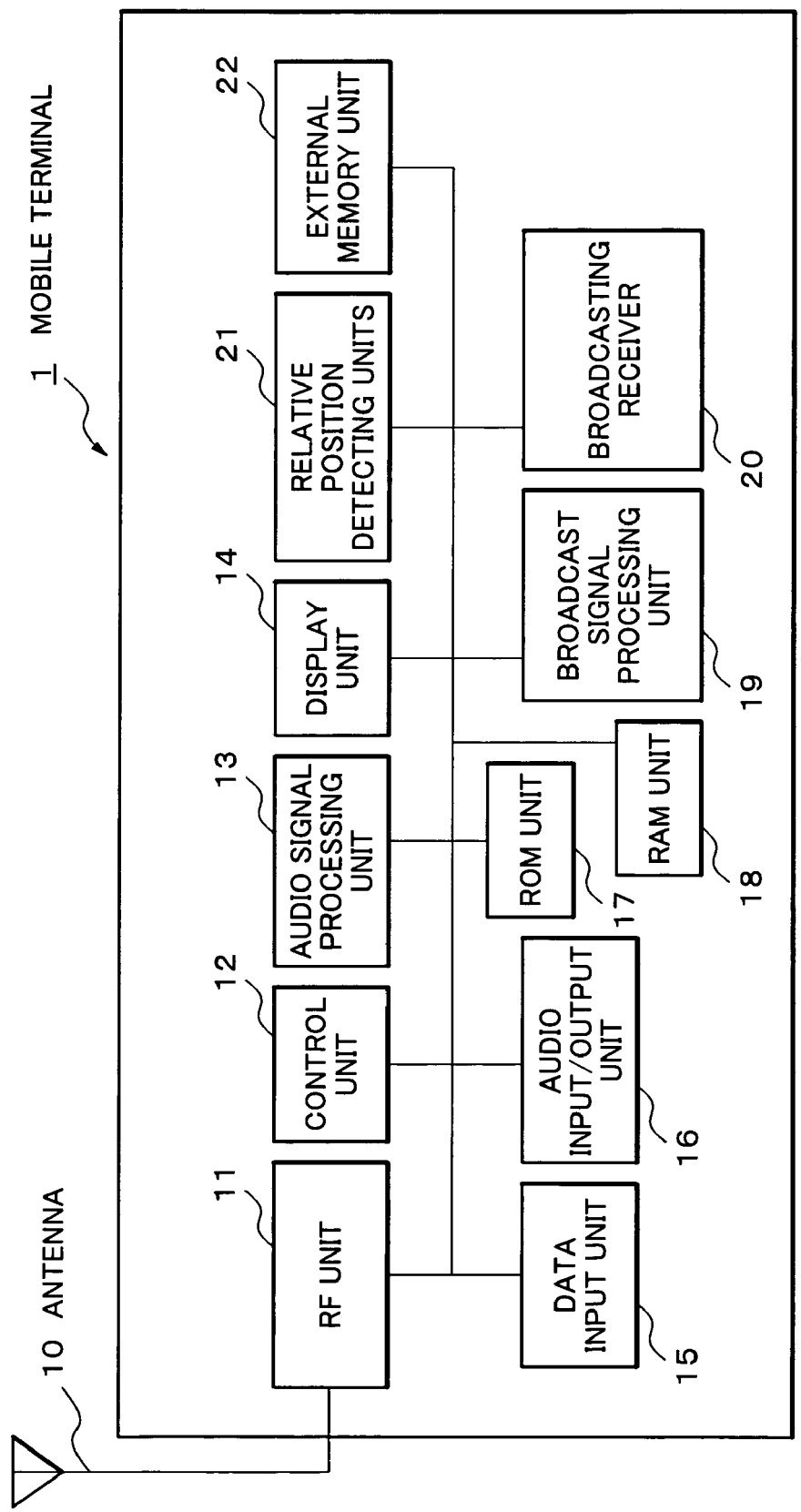
FIG. 1 is a block diagram showing a structure of a mobile terminal according to an exemplary embodiment of the present invention.

FIG. 1 is a block diagram showing a structure of a mobile terminal according to the exemplary embodiment of the present invention.

Referring to FIG. 1, the mobile terminal according to the embodiment of the present invention includes an antenna 10, a radio frequency (RF) unit 11, a control unit 12, an audio signal processing unit 13, a display unit 14, a data input unit 15, an audio input/output unit 16, a read only memory (ROM) unit 17, a random access memory (RAM) unit 18, a broadcast signal processing unit 19, a broadcasting receiver 20, a relative position detecting units 21, and an external memory unit 22.

Then, an operation of the respective units of the mobile terminal according to this exemplary embodiment of the present invention will be described with reference to the accompanying drawings.

The RF unit 11 transmits and receives radio signals through the antenna 10 with a mobile communication base station (not shown) and the like.

The control unit 12 performs various kinds of control in the mobile terminal 1. As these contents of control, the reproductive interruption and resumption which are performed by playback end from record start of a broadcast program are included.

The audio signal processing unit 13 converts an audio signal inputted from an audio input unit (a microphone) of the audio input/output unit 16 into a digital signal and outputs it to the RF unit 11. Also, the audio signal processing unit 13 converts a digital signal received in the RF unit 11 into a voice signal and outputs it to an audio output unit (a speaker) of the audio input/output unit 16.

The display unit 14 displays various information such as messages for a user and image information about the broadcast signal input from the broadcast signal processing unit 19.

The data input unit 15 inputs various command by the user in response to key operation.

The audio input/output unit 16 inputs an audio signal of the user through the audio input unit, and outputs an audio signal from a phone line and an audio signal from the audio signal processing unit 13 to the audio output unit.

The ROM unit 17 previously saves a plurality of operational program of the mobile terminal 1 necessary for the control unit 12 to perform a required control. These operational programs cannot normally be rewritten by the user.

The RAM unit 18 temporarily saves working data necessary for the control unit 12 to perform various operations, setup information commanded by the user, and the like.

The broadcast signal processing unit 19 converts a broadcast signal received through the broadcasting receiver 20 into a coded image signal and audio digital signal, and outputs its signals to the display unit 14 and the audio signal processing unit 13, respectively.

The broadcasting receiver 20 receives a broadcast signal transmitted from a broadcast base station, and obtains a broadcast program.

The relative position detecting unit 21 detects a relative position of the two housings (first and second housings) which consists of the mobile terminal 1, and outputs the signal according to a detection result. As an example in this embodiment of the present invention, there is detection of change by flip open/close corresponding to use/unused state of the mobile terminal 1.

The external memory unit 22 is equipped with a slot into which a commercialized (marketed) memory card can be equipped, and can interface with the memory card equipped to the mobile terminal 1. This external memory unit 22 provides an interface, for example, with a mini Secure Digital (SD) memory card, and can equip a slot with a mini SD memory card prepared independently. Thus, it is possible to save various user data (various contents such as memory dial (address book), sent and received e-mails, image data, incoming call melody) in the equipped mini SD memory card. Furthermore, apart from the various user data, it is possible to record the broadcast program received by the broadcasting receiver 20 as a video file. A classification of the video file recorded in a mini SD memory card is not limited, and the received broadcast signal may be recorded in a video file format of a Moving Picture Expert Group (MPEG) 4 movie (or short, MP4).

Here, as communication function which is offered to a mobile terminal, there are four kinds of functions as follows, for example.

(1) A function of a telephone call via a radio communication link by the RF unit 11.

(2) A function of Web access via the radio link interconnected with Internet.

(3) A function of sending and receiving e-mail via the radio link interconnected with Internet.

(4) A function of receiving broadcast signals transmitted from a broadcasting station.

Other than those above, it is possible to use an existing technology also for header information excluding the main body of an e-mail and communication procedures (protocols).

Figure 2A:
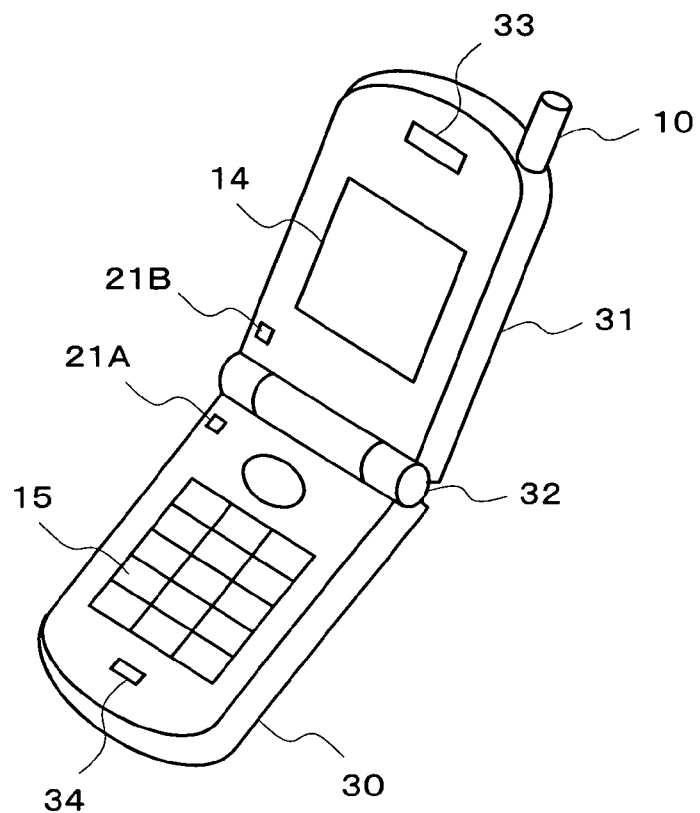
FIG. 2A is an outside drawing showing a use state in the mobile terminal shown in FIG. 1.
Figure 2B:
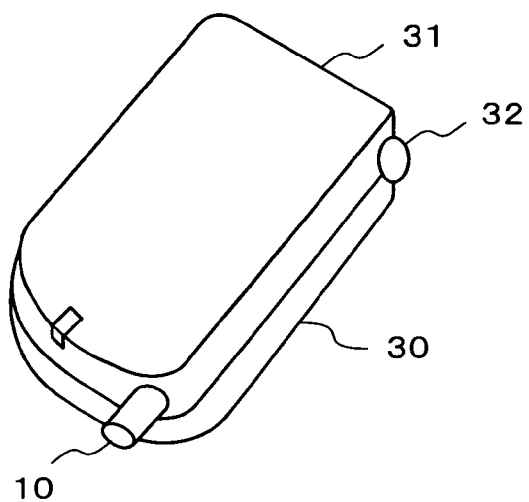
FIG. 2B is an outside drawing of a unused state in the mobile terminal shown in FIG. 1.

Next, a description will be given of an example of the preferable configuration with regard to the embodiment of the present invention. FIG. 2A is an outside drawing showing a use state in the mobile terminal shown in FIG. 1, and FIG. 2B is an outside drawing of an unused state in the mobile terminal shown in FIG. 1.

As shown in FIG. 2A, the mobile terminal 1 of this embodiment of the present invention has a structure in which first housing 30 and second housing 31 is joined upon a hinge unit 32. Furthermore, as shown in FIG. 2B, the mobile terminal 1 is a flip or holder type which makes the first housing 30 and the second housing 31 to face each other, as an axis of center upon a hinge unit 32.

The first housing 30 is provided with the data input unit 15 and the audio input unit 34 of the audio input/output unit 16 shown in FIG. 1. The second housing 31 is provided with the display unit 14 and the audio output unit 33 of the audio input/output unit 16 shown in FIG. 1. Moreover, the relative position detecting units 21 shown in FIG. 1 are separately disposed on the first housing 30 and the second housing 31 respectively as a relative position detecting unit 21A and a relative position detecting unit 21B.

Therefore, as the mobile terminal 1 is unfolded (in flip open), it becomes the case which the user can use the mobile terminal 1 for a purpose of such as usual communication by use of the data input unit 15 and the audio input unit 34 provided on the first housing 30, and the display unit 14 and the audio output unit 33 provided in the second housing 31. Also, as the mobile terminal 1 is folded up (in flip close), it usually becomes the case which functions such as audio input and output of the mobile terminal 1 are not used.

The relative position detecting units 21A and 21B detect that the mobile terminal 1 is in flip close by coming in contact (or close), when the mobile terminal 1 has been folded. Also, the relative position detecting units 21A and 21B detect that the mobile terminal 1 is in flip open by coming out, when the mobile terminal 1 has been unfolded.

Figure 3:
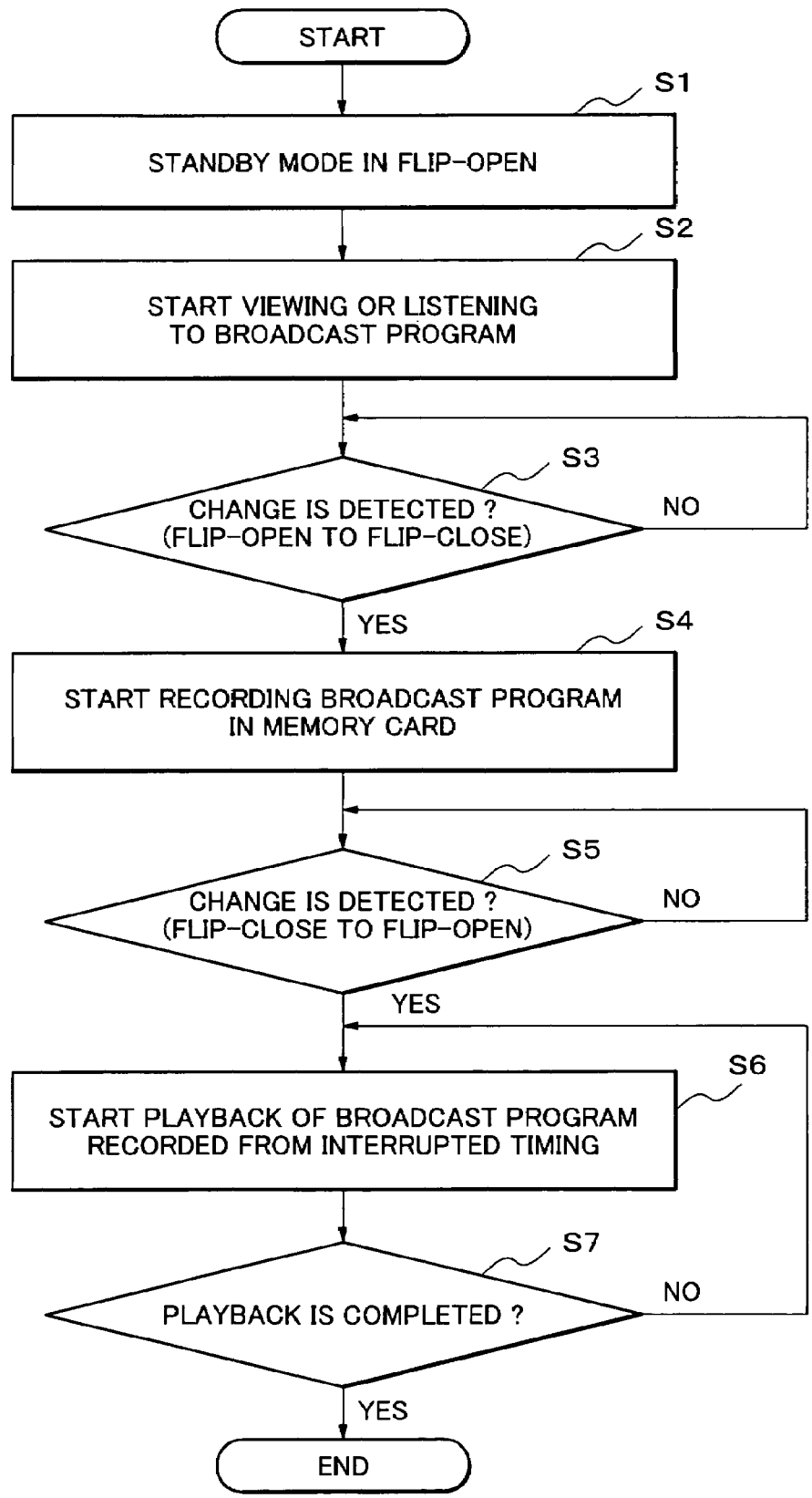
FIG. 3 is a flowchart for explaining an exemplary operation in the mobile terminal shown in FIG. 1.

Next, a description will be given of the preferable operations of the embodiment of the present invention. FIG. 3 is a flowchart for explaining an exemplary operation in the mobile terminal shown in FIG. 1.

According to FIG. 3, the mobile terminal 1 first goes into a standby mode for receiving a broadcast signal, when the two housings are unfolded (in flip open) as shown in FIG. 2A (Step S1). If a predetermined command by the user is inputted from the data input unit 15 in this mode, the mobile terminal 1 starts to receive the broadcast signal.

When the broadcasting receiver 20 starts the reception of a broadcast signal, the broadcast signal processing unit 19 generates coded image signals and audio digital signals from the broadcast signal. The generated coded image signals are displayed on the display unit 14. The generated audio digital signals are converted into audio signals at the audio signal processing unit 13, and the audio signals is output from the audio output unit 33 of the audio input/output unit 16. In the procedure of the above-mentioned operation, it is possible to view or listen to the broadcast program designated by the user (Step S2).

Next, a description will be given of the operations of the mobile terminal 1, when the user who got urgent business in this state folds up the mobile terminal 1 for the purpose of containing in a bag, or the like.

When the state of the mobile terminal 1 change from flip open shown in FIG. 2A to flip close shown in FIG. 2B, the relative position detecting units 21 detects that the relative position of the two housings has changed from release state to contact state (Step S3).

Subsequently, when the relative position detecting unit 21 detects the flip close of the mobile terminal 1, the control unit 12 interrupts the outputs to the display unit 14 and the audio output unit 33, and the broadcasting receiver 20 continues to receive the broadcast signal and outputs the received signals to the broadcast signal processing unit 19.

The broadcast signal processing unit 19 outputs the coded image signals and audio digital signals, and the external memory unit 22 starts recording in the installed mini SD memory card (Step S4). When recording them in the mini SD memory card, the control unit 12 may convert the coded image signals and audio digital signals of the broadcast signal into the movie file format of an MP4 format which is a predetermined file format.

Next, a description will be given of the operations of the mobile terminal 1, when the user unfolds the mobile terminal 1 again while recording in the mini SD memory card.

When the mobile terminal 1 comes to the unfolded state (flip open) shown in FIG. 2A from the folded state (flip close) shown in FIG. 2B, the relative position detecting units 21 detects that the relative position of the two housings has changed from contact state to release state (Step S5).

The control unit 12 which has received the detection signal starts playing back the broadcast program recorded in the mini SD memory card from the timing which interrupted viewing and listening (Step S6). Accordingly, the coded image signals are outputted and displayed on the display unit 14, and the audio digital signals are outputted as the audio signals from the audio output unit 33 through the audio signal processing unit 13. Then, when finishing playback of the broadcast program recorded in the mini SD memory card, the playback of the broadcast program is completed according to user's command of playback end which is input from the data input unit 15 (Step S7). The playback end may be intended to be preset automatically.

From the above-mentioned description, the mobile terminal 1 of the embodiment of the present invention can automatically start recording a broadcast program and playing back a recorded broadcast program only by detecting a change in fold/unfold (flip open/close) of the two housings by use of the relative position detection units 21.

Here, as the results of detecting whether the two housings are unfolded or folded, the following operation setups are assumed.

(a) Record start/not-start based on flip close detection after starting viewing or listening to a broadcast program.
(b) Record continuation/stop and playback start/not-start based on flip open detection after flip close.
(c) Record continuation/stop based on flip close detection after starting playback.

For example, when the two housings change to flip close while receiving a broadcast signal in flip open of the two housing, record start is selected. Next, when the two housings change to flip open after interruption, record continuation and playback start is selected. Moreover, when the two housings change to flip close after starting playback, record continuation is selected. According to the above setup, even if the two housings are repeatedly unfolded and folded, it is possible to play back the broadcast program later without breaking off until the end of the broadcast program which is being viewed or listened to. These operations can be supposed to be selected and set by the user in advance. Therefore, even if some urgent business comes up with the user, the user can view or listen to the broadcast program in a follow-up reproduction about a period of folded state only by unfolding or folding the two housings. On the other hand, when playback is no longer required, the user can stop playback irrespective of when playing back the broadcast program at any time.

Here, the operation of the mobile terminal according to the embodiment of the present invention can be executed using a computer installed in the control unit 12. When it is executed on the computer, the programs for executing the operation of the mobile terminal 1 are saved in the ROM unit 17 or the RAM unit 18. The programs are loaded into the computer. The computer performs the operation in accordance with the loaded program, whereby a series of control on the basis of the control unit 12 are executed on the computer.

Figure 4:
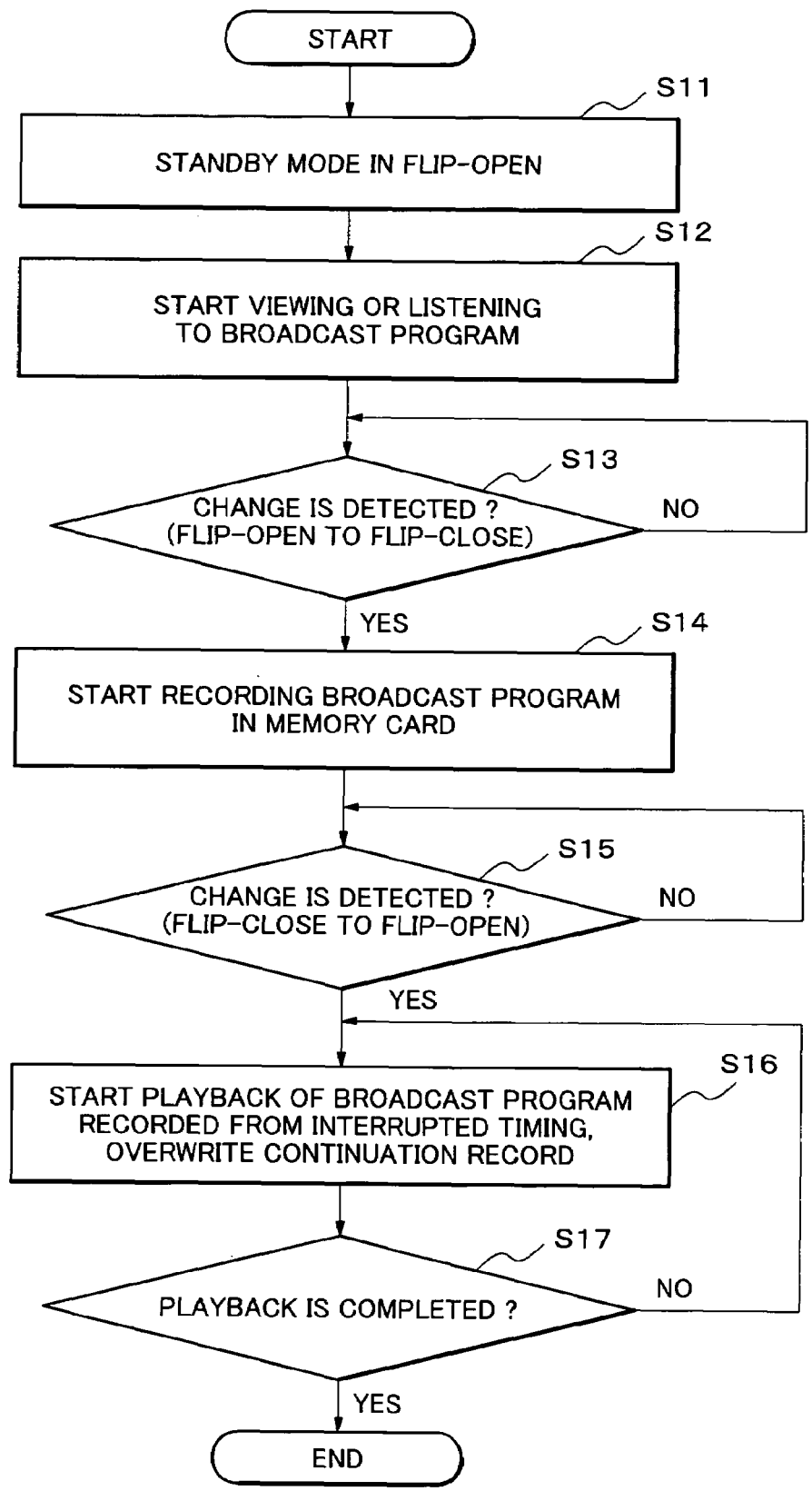
FIG. 4 is a flowchart for explaining another exemplary operation in the mobile terminal shown in FIG. 1.

Next, a description will be given of the operation of a mobile terminal of another embodiment of the present invention. FIG. 4 is a flowchart for explaining another exemplary operation in the mobile terminal shown in FIG. 1.

In this embodiment of the present invention, the configuration of the mobile terminal and its appearance are the same as the case of the above-mentioned embodiment shown in each of FIGS. 1 and 2. However, the control method of recording and playing back a broadcast program by the control unit 12 after resuming viewing or listening to the broadcast program is different from the above-mentioned embodiment.

According to FIG. 4, Steps S11 to S15 is the same as Steps S1 to S5 of the embodiment shown in FIG. 3 regarding the operations of the mobile terminal 1.

In Step S15, when a change to flip open is detected once again, the control unit 12 which has received the detection signal starts playing back the broadcast program recorded in the mini SD memory card from the timing which interrupted viewing and listening.

Here, the external memory unit 22 sequentially overwrites the broadcast program which is continuously recorded on the portion of the mini SD memory card where playback has been ended (Step S16). Then, when finishing viewing or listening to the broadcast program recorded in the mini SD memory card, the playback of the broadcast program is completed according to user's command of playback end which is input from the data input unit 15.

As described above, the mobile terminal of the embodiment first receives the broadcast signal in flip open (use state), and then the viewing or listening is started. When a change from flip open to flip close (unused state) is detected while viewing or listening to the broadcast program, the recording of the broadcast program is started, as well as the external output is interrupted. Then, when a further change from flip close to flip open is detected, the mobile terminal 1 starts playback of the broadcast program while continuing record. For this reason, even if viewing or listening to the broadcast program is interrupted by folding the two housings during the reception of the broadcast signal, when the two housings are unfolded again, it is possible to continuously view or listen to the broadcast program from the timing which interrupted viewing and listening without breaking off.

Furthermore, when starting playback, it is possible to obtain effects of reducing the storage capacity of a memory by overwriting in a memory portion where playback has been ended.

Hence, as the result of detecting unfolding/folding (flip open/close) of the two housings, the following operation setup is added.

(d) Record continuation/stop, playback start/not-start, and overwrite start/not-start based on flip open detection after flip close.

Here, as for the mobile terminal of the present invention, it is possible for a user to choose the combination of the above-mentioned (a) to (d). It is contained in the present invention even if there are design changes of the range which does not deviate from intent and purpose of the present invention.

Moreover, the received broadcast signal includes analog television broadcast signal, terrestrial analog broadcast signal, radio broadcast signal, and so on. And, a devise for recording the received broadcast signal or broadcast information may be a mini SD memory card, a memory card in another format, a built-in storage device of the mobile terminal, or a storage device connected to the outside of the mobile terminal (a hard disc device, a writable optical disc device or the like). Otherwise, the received broadcast signal or broadcast information may be saved in a server of network, by connecting to the network. Also, means of detecting a relative position may be a detection of mechanical contact, or a detection of magnetic proximity.

In addition, the mobile terminal of the embodiment of the present invention may be a flip or folder type, an one-axis or two-axes rotation type, a slide type, and so on, namely a type in which a positional relation of two housings are changed for putting away.

Also, the processing which is shown in the flowchart FIGS. 3 and 4 are executed with their functions by saving the program of recording and reproducing a broadcast program in the ROM unit 17 or the RAM unit 18, loading it into the computer included in the control unit 12, and executing it.

While this invention has been described in connection with certain exemplary embodiments, it is to be understood that the subject matter encompassed by way of this invention is not to be limited to those specific embodiments. On the contrary, it is intended for the subject matter of the invention to include all alternative, update, and equivalents as can be included within the spirit and scope of the following claims.

Further, the inventors' invention is to retain all equivalents of the claimed invention even if the claims are amended during prosecution.

What is claimed is:

1. A mobile terminal capable of receiving broadcast signals, in which two housings are joined, the mobile terminal comprising:
   an external memory unit which provides an interface with a memory unit for recording a broadcast program;
   a relative position detecting unit which detects a change in a relative position of the two housings; and
   a control unit which controls recording and playing back of the broadcast program to the memory unit based on a detection result provided by the detecting unit, wherein when a change from flip open to flip close of the two housings is detected during outputting the broadcast program being received, interrupting outputting the broadcast program and starting recording the broadcast program in the memory unit, and when the flip open is detected again, the playback of the broadcast program is started from a timing where outputting has been interrupted while continuing recording.

2. The mobile terminal according to claim 1, wherein start, interruption, resumption, and stop of recording and playing back in response to the change in the relative position of the two housings is preset.

3. The mobile terminal according to claim 2, wherein when playing back the recorded broadcast program, a continuing portion of the broadcast program is sequentially overwritten on the portion where the playback has finished.

4. A control method for recording and playing back of a mobile terminal capable of receiving broadcast signals, in which two housings are joined, the control method comprising:
providing an interface with a memory unit for recording a broadcast program;
detecting a change in a relative position of the two housings; and
controlling recording and playing back of the broadcast program to the memory unit based on a detection result, wherein
when a change from flip open to flip close of the two housings is detected during outputting the broadcast program being received, interrupting outputting the broadcast program and starting recording the broadcast program in the memory unit, and when the flip open is detected again, the playback of the broadcast program is started from a timing where outputting has been interrupted while continuing recording.

5. The control method for recording and playing back of a mobile terminal according to claim 4, wherein start, interruption, resumption, and stop of recording and playing back in response to the change in the relative position of the two housings is preset.

6. The control method for recording and playing back of a mobile terminal according to claim 5, wherein when playing back the recorded broadcast program, a continuing portion of the broadcast program is sequentially overwritten on the portion where the playback has finished.

7. A mobile terminal capable of receiving broadcast signals, in which two housings are joined, the mobile terminal comprising:
a broadcasting receiver which receives broadcast signals transmitted from a broadcast station, and which obtains a broadcast program;
a display unit and a audio input/output unit which outputs images and audio signals of the broadcast signal;
an external memory unit which provides an interface with a memory unit for recording a broadcast program;
a relative position detecting unit which detects a change in a relative position of the two housings;
a data input unit for a user to input various commands; and
a control unit to control recording and playing back of the broadcast program based on a detection result, wherein
when a change from flip open to flip close of the two housings is detected during outputting the broadcast program being received, interrupting outputting the broadcast program and starting recording the broadcast program in the memory unit, and when the flip open is detected again, the playback of the broadcast program is started from a timing where outputting has been interrupted while continuing recording.

8. The mobile terminal according to claim 7, wherein start, interruption, resumption, and stop of recording and playing back in response to the change in the relative position of the two housings is preset.

9. The mobile terminal according to claim 8, wherein when playing back the recorded broadcast program, a continuing portion of the broadcast program is sequentially overwritten on the portion where the playback has finished.

10. A control method for recording and playing back in a mobile terminal capable of receiving broadcast signal, in which two housings are joined, the control method comprising:
standing by receipt of a broadcast signal in flip open;
starting outputting a broadcast program based on a command by a user;
detecting a change of relative position of the two housings;
starting recording in a memory unit when a change in a relative position of the two housings is detected;
starting playback of the recorded broadcast program when the flip open is detected again; and
stopping playing back when playback of the recorded broadcast program is terminated, wherein
when a change from flip open to flip close of the two housings is detected during outputting the broadcast program being received, interrupting outputting the broadcast program and starting recording the broadcast program in the memory unit, and when the flip open is detected again, the playback of the broadcast program is started from a timing where outputting has been interrupted while continuing recording.

11. The method according to claim 10, wherein start, interruption, resumption, and stop of recording and playing back in response to the change in the relative position of the two housings is preset.

12. The method according to claim 11, wherein when playing back the recorded broadcast program, a continuing portion of the broadcast program is sequentially overwritten on the portion where the playback has finished.

* * * * *